(12) United States Patent  (10) Patent No.: US 6,914,662 B2
Paige et al.  (45) Date of Patent: Jul. 5, 2005

(54) DIGITAL PROJECTOR AUTOMATION

(75) Inventors: Robert Paige, Cedar City, UT (US); Christopher H. Theiste, Plymouth, MN (US); Pat Redmond, Littleton, CO (US); Al Remy, Rowlett, TX (US); John Durliat, Maynardville, TN (US); Steve Allen, Bothell, WA (US); Bob Wall, Pinson, AL (US)

(73) Assignee: Regal CineMedia Corporation, Centennial, CO (US)

( * ) Notice: Subject to any disclaimer, the term of this patent is extended or adjusted under 35 U.S.C. 154(b) by 0 days.

(21) Appl. No.: 10/458,589

(22) Filed: Jun. 10, 2003

(65) Prior Publication Data

US 2004/0252280 A1 Dec. 16, 2004

(51) Int. Cl.[7] .............................................. G03B 21/32
(52) U.S. Cl. ....................................................... 352/41
(58) Field of Search ...................... 352/41, 203; 353/85

(56) References Cited

U.S. PATENT DOCUMENTS 6,709,115 B2 * 3/2004 Chimura et al. ............ 353/119

OTHER PUBLICATIONS

Christie Digital Systems, Inc., "ChristieNet Model No. 38-804731-01 Owner's Manual,"pp. 1–84.
Christie Digital Systems, Inc., "Connect AV to IT," 2002 pp. 1-2.
Christie Digital Systems, Inc., "CineNET Digital On–Screen Advertising Content Solution," p. 1.
Christie Digital Systems, Inc., "Integrated, Flexible and Affordable, Christie's CineNet is a Solution of Unprecedented Capability and Power," pp. 1–2.
Christie Digital Systems, Inc., "Digital On–Screen Advertising and Content Solution," p. 1.
Scott E. Norwood, "re.arts.movies. tech, Frequently Asked Questions (FAQ) (with answers) Version 2.00,"[online] [retrieved on Feb. 10, 2003], Retrieved from the Internet URL http://www.redballoon.net/~snorwood/faq2.html, pp. 1–60.

* cited by examiner

Primary Examiner—Rodney Fuller
(74) Attorney, Agent, or Firm—Stuart L. Langley; Hogan & Hartson L.L.P.

(57) ABSTRACT

A method for controlling a digital projector by sensing a condition of a switched power outlet and determining and performing at least one programmed response to the sensed condition. Also, a digital projector interface having a switched outlet interface for receiving a signal indicating a condition a switched power outlet and a processor coupled to the switched outlet interface. Processes implemented by the processor are responsive to the switched outlet condition to perform a preselected function involving a digital projector in response to the switched outlet condition.

18 Claims, 4 Drawing Sheets

DIGITAL PROJECTOR AUTOMATION

BACKGROUND OF THE INVENTION

1. Field of the Invention

The present invention relates, in general, to systems and methods for displaying movies, advertising, and alternative content, and, more particularly, to software, systems and methods for automating digital projection equipment by extending and augmenting existing film projection systems.

2. Relevant Background

Film-based entertainment such as movies, live events combined with film features, and the like remain an important vehicle for entertainment and education throughout the world. The ambiance of a theatre is what continues to draw audiences even though many other venues for watching movies exist. The ambience created by lighting, sound, seating, picture quality, and other factors contribute to a unique entertainment environment that continues to be preferred by audiences. As a result, there exists a significant installed base of theatres in the United States and throughout the world that include equipment and facilities for displaying film-based material. A typical theatre comprises one or more auditoriums where each auditorium includes a projection, sound, and auditorium devices that control various activities during a presentation. A projection room or booth houses projectors, sound equipment, controllers, and the like used to control auditorium lighting, sound, and other functions involved in presenting film-based content to an audience. Traditionally, the projection booth is staffed by a projectionist who is responsible for loading film reels onto the projector, adjusting the optical and audio properties within the auditorium, and turning the projectors on and off at appropriate times.

Manual performance of projectionist functions has some advantages in that certain activities such as adjusting sound and light levels benefit from the presence of a skilled projectionist. However, other functions such as turning projectors on and off or synchronizing the projection with other events in the auditorium may be improved by automation. As events become more complex and involve more complex synchronization of activities, the need for automation within the projection booth has increased. Moreover, automations allow a single projectionist to staff multiple auditoriums, thereby reducing cost of presenting an event.

There have been significant efforts to automate activities within the projection booth. These automations are typically designed for film-based content in that they interface to film projectors. For example, an automation controller may sense cues embedded in a conventional film and adjust picture or sound format or turn projection equipment on and off. Such controllers can be used to automate the activities involved in switching from one active projector to another as may be performed when switching between a various segments of and event such as preshow features, trailers, advertisements and a feature presentation.

Because these automation controllers are designed for film-based content, they have limited ability to assist in the automation of alternative projection equipment. For example, digital projection equipment is a rapidly evolving alternative to film-based equipment. Digital projection equipment enables using digital content that can be selected for presentation and loaded into projection equipment moments before the actual presentation. Digital content can be revised and updated much more efficiently than film-based content. As a result, digital projection equipment offers significant advantages for theatre owners.

Current projection rooms are limited in that they use a switched outlet to turn the projector on/off. A switched outlet, which turns power on and off rapidly, is adequate for a film-type projector, but causes significant aging of digital projector components such as bulbs. As digital projector bulbs are expensive, excessive wear can be a significant deterrent to using digital equipment. Commonly, a digital projector requires a soft turn on and/or turn off to allow the bulb to heat and cool more gradually. For example, a bulb may be turned off while the fan continues to operate. A switched outlet cannot be used for this purpose because it would remove power from the bulb and fan at the same time. However, because the switched outlet is the only universally available method for controlling the projection equipment, it has been difficult to use the existing automation systems with expensive digital projection equipment.

In a typical application, a switched outlet is provided to control the changeover from a 35 mm slide show presenting pre-show features to a film projector used to present the movie. Using the switched outlet, a film projector can be turned on and the slide projector turned off at the same time to provide an immediate transition. However, when a digital projector is used instead of a slide projector, the switched outlet cannot be used. Instead, a common solution is to implement a network interface to the digital projector which exposes the soft turn-off feature of the projector itself. A command can be sent over the network to initiate the soft turn on/off. This solution requires software to generate the network commands and requires that the on/off command be synchronized with other events, such as activation of the film projector. Hence, existing solutions are complex and cannot take advantage of the switched outlet interface.

In general, digital projectors are designed for network-based control. A digital projector control system typically involves processes executing on a network-attached computer that issues commands to the digital projector over a network connection using network protocols. In contrast, existing film-based control systems directly couple to the film-based projector and respond to cue information encoded on the film to implement various theatre functions. It is desirable to have both control systems available and operating in a synchronized fashion, however, existing film-based control systems do not provide interfaces to digital projectors or to the digital projector control systems. Interfacing these two separate control systems is possible, but adds to the complexity and cost of a system. Accordingly, a need exists for a cost-effective system and methodology for coordinating the operation of these two otherwise independent control systems.

In addition to changes in digital projection, there are an increasing variety of audio formats and equipment for presenting audio content. A typical theatre auditorium has an installed sound system that may include a cinema audio processor for decoding and filtering various encoded signals, as well as amplifiers, speaker systems and the like for presenting the audio content.

Conventional sound-on-film systems for 35 mm theatre-class projection systems use optical encoding and generate an audio signal from the projector. This system is inexpensive and standardized, so that almost every theatre projection setup in the world is capable of reproducing it. Accordingly, many sound systems are specifically designed to receive audio signals from a projector, but are not equipped to receive audio information from alternative sources such as computers, DVD players, CD players, and the like. One solution to this problem has been to install a media adapter such as a DMA™-8 adapter produced by Dolby Laboratories, Inc. This equipment allows switching various input sources to drive a multi-channel output to a sound system. However, this type of switching equipment is relatively expensive, and provides more features than may be necessary in many applications. Accordingly, a need exists for a simple yet robust and functional system and method for interfacing theatre sound systems and audio processors with alternative audio sources.

In view of the above, there is an acute need for a new, flexible yet easy to configure projection automation system that will overcome the above shortcomings of current theatre equipment and practices.

SUMMARY OF THE INVENTION

The present invention involves a soft shutdown mechanism that responds to a conventional switched outlet to initiate a soft shutdown process for digital projectors rather than the abrupt shut off normally provided by the switched outlet. For example, the present invention may be implemented to leave cooling fans on after the lamp power is removed, gradually remove power from lamp, or other actions that will preserve equipment life.

Optionally, processes are included to generate one or more notifications to a projectionist regarding the start time of a feature presentation. A projectionist may be alerted by particular tones, blinking lights, a countdown timer, email notification and/or pager notifications. This notification prompts the projectionist to prepare for a transition between digital projector presentation and film projector presentation, which may involve adjusting one of the projectors, starting one of the projectors, stopping one of the projectors, or other process that involves manual intervention. When automated projection equipment is involved, the notification can be made to the automated system to warm up the projector, start the projector or perform other theatre operations such as adjusting lighting, sound, curtains, screen level, and the like.

Briefly stated, the present invention involves a method for controlling a digital projector by sensing a condition of a switched power outlet and determining and performing at least one programmed response to the sensed condition. Also, the present invention involves a digital projector interface having a switched outlet interface for receiving a signal indicating a condition a switched power outlet and a processor coupled to the switched outlet interface. Processes implemented by the processor are responsive to the switched outlet condition to perform a preselected function involving a digital projector in response to the switched outlet condition.

DETAILED DESCRIPTION OF THE PREFERRED EMBODIMENTS

The present invention is illustrated and described in terms of a distributed theatre environment such as might be implemented by a national chain of theatres or an organization of cooperating independent theatre owners. However, the present invention is readily scaled to provide both international and local services, and may be implemented in a single venue. It should be understood that while the exemplary implementations involve controlling projection equipment to coordinate the presentation of pre-show advertisement with a main feature, the present invention is broadly applicable to a variety of control tasks that may be required in a projection booth.

Figure 1:
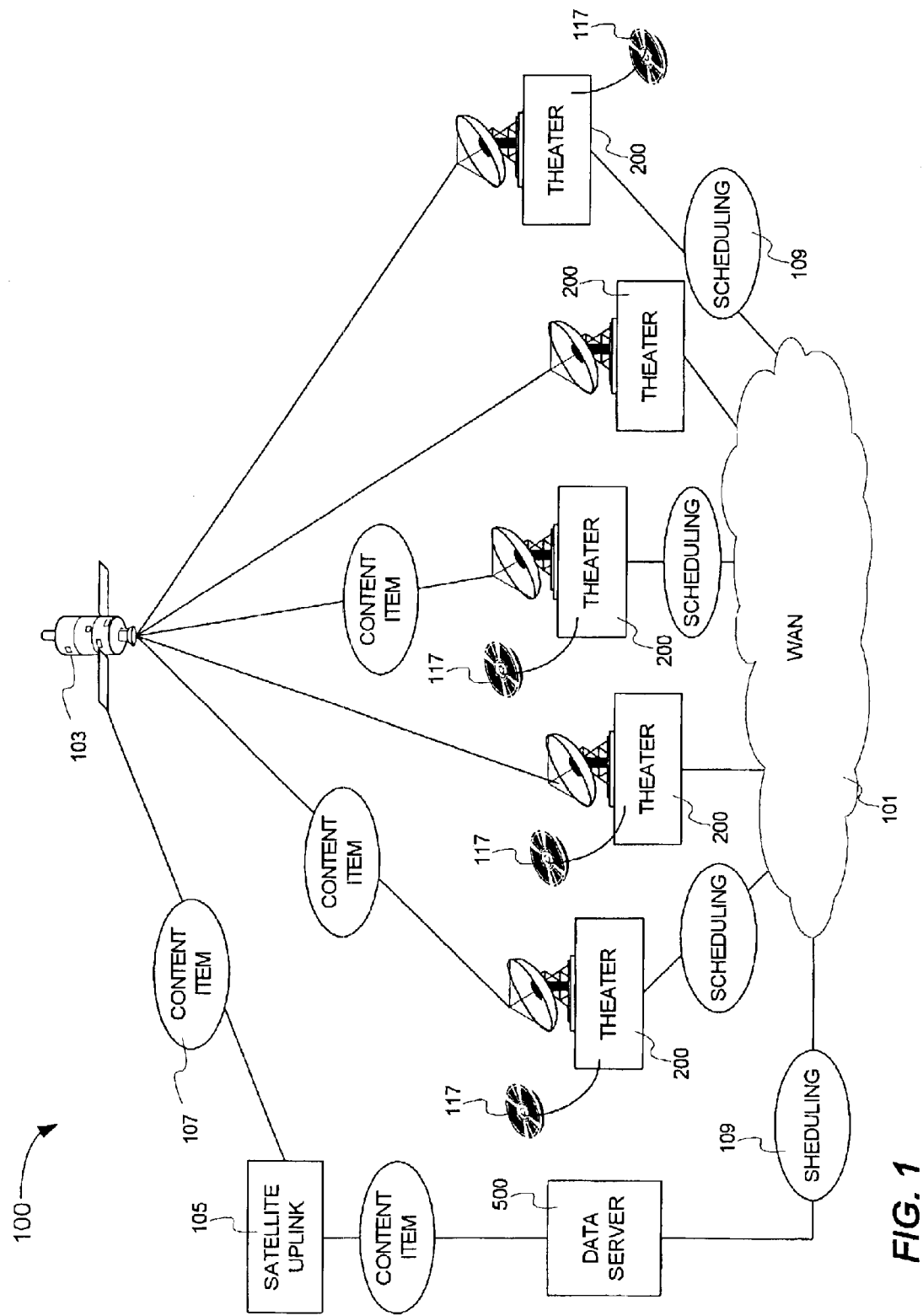
FIG. 1 shows a networked theatre environment in which the present invention is implemented.

FIG. 1 shows an exemplary theatre environment 100 in which the present invention may be implemented. Environment 100 includes a plurality of theatre facilities 200, described in reference to FIG. 2, that are coupled to a data communication network such as wide area network (WAN) 101. Theatre facilities 200 may be distributed over any geographic area including regionally, nationally, or worldwide. A significant advantage of the present invention is that it enables coordinated presentation of both digital content 107 and conventional analog or film-based content 117 using existing theatre automation systems. The present invention enables the efficient integration of newer digital projection technologies and equipment into an existing theatre 200 that was designed for film-based equipment.

Figure 5:
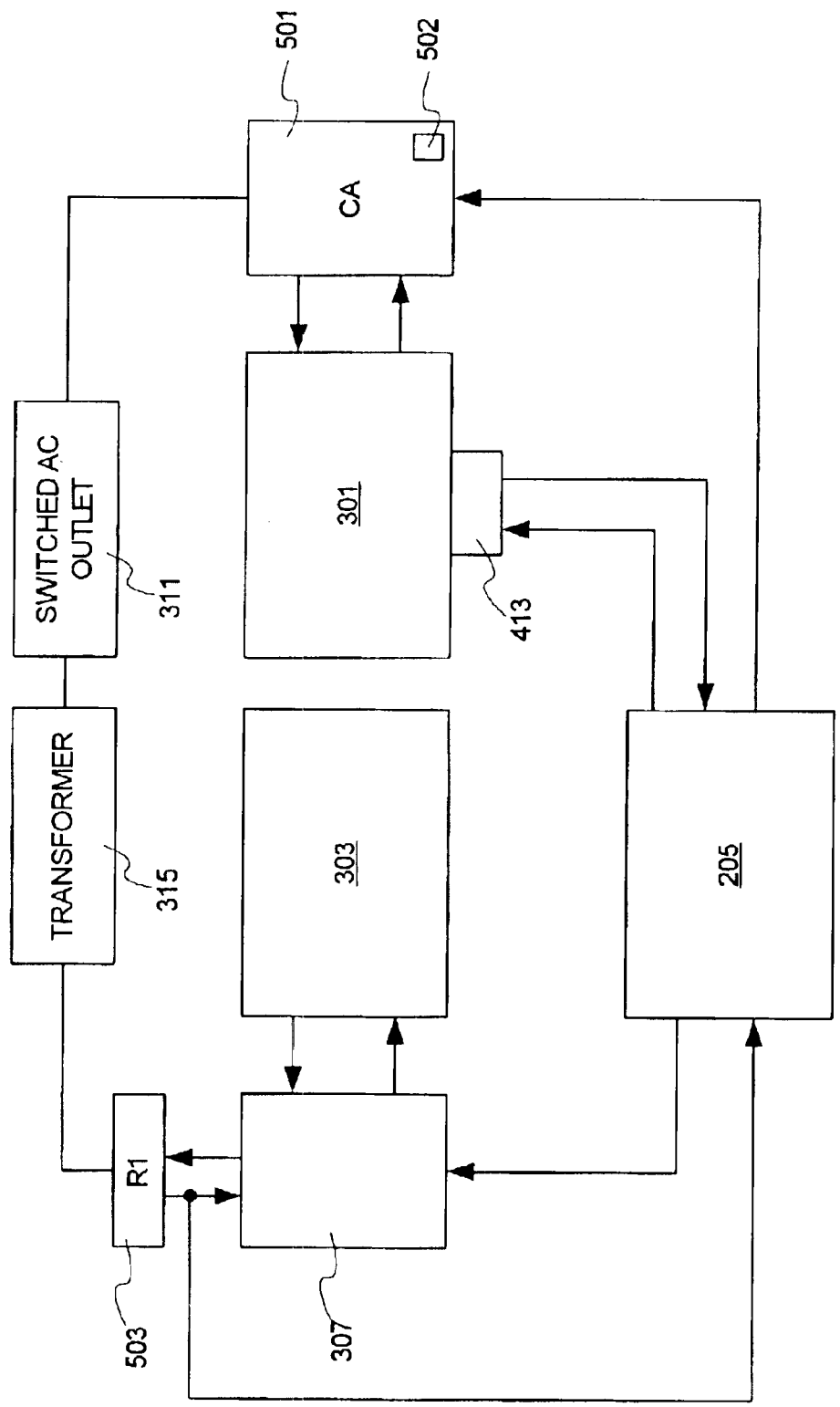
FIG. 5 illustrates, in block-diagram form, a components of a projection automation system in accordance with the present invention.

Environment 100 also includes one or more shared resources such as data server 500, described in greater detail in reference to FIG. 5. Data server 500 implements services to distribute digital content items 107 such as advertisements to appropriate theatres 200. Data server 500 also implements services to distribute scheduling information 109 that can be used by theatres 200 to create and present appropriate presentations such as pre-show features. WAN 101 may be implemented by any available networking technology and protocols including private networks and public networks such as the Internet, although in either case appropriate security and authentication protocols may be desirable to prevent unauthorized system access. WAN 101 is primarily configured to support full duplex communication between theatres 200 and data server 500 to exchange scheduling information 109 used to schedule presentation of content items, and to report back on the status of scheduled content items to verify their presentation. However, WAN 101 may also be used to distribute the content items 107 themselves in some circumstances.

Because the content files tend to be larger multimedia files, in the particular implementation of FIG. 1 environment 100 includes a high bandwidth broadcast/multicast communication link implemented, for example, by a digital broadcast satellite (DBS) 103 through satellite uplink 105. Satellite 103 may be a private system, or may be provided by a contact satellite operator such as Hughes Network Systems of Germantown Md. In the particular example, digital content items 107 comprise media files that, when played, range in length from a few seconds up to about 5 minutes. In other implementations such as digital cinema or event presentations, the digital content items 107 may comprise many minutes or even hours of material. The present invention is adaptable to any available encoding format and compression technique including proprietary mechanisms and industry standard formats such as MPEG-1, MPEG-2 and other MPEG standards that are available, "avi" files (audio video interleaved), "wav" (windows audio video), Windows Media audio and video files (identified by various file extensions such as asf, .asx, .wax, .wm, .wma, .wmd, .wmp, .wmv, .wmx, .wpl, and .wvx), Macromedia flash (identified by ".swf" extensions), for example. Various file types, including raw data file types, may be used so long as appropriate encoding and decoding mechanisms are available to the system.

Hence, digital items files 107 may vary in size from a few thousand bytes to a many gigabytes or more when encoded using an industry standard formats. Content files 107 may also comprise still images and/or audio files that are considerably smaller. Accordingly, the high bandwidth broadcast/multicast solution shown in FIG. 1 may be modified as needed, or eliminated in some cases, to meet the needs of distribution content items 107 used in a particular application. Suitable alternatives include terrestrial cable and microwave transmission and other data communication technologies.

In operation, content scheduling information 109 is distributed to specific theatres 200 that will use that scheduling information. For example, if a content item 107 is to be used only in theatres in New York City, scheduling information 109 associated with that content item 107 will be communicated only to theatres 200 that are in New York City. Scheduling information 109 specifies, among other things, when digital content items 107 will be presented with respect to particular conventional content items 117. In accordance with the present invention, the scheduling information 109 can be used to control both film-based and digital projection equipment.

Figure 2:
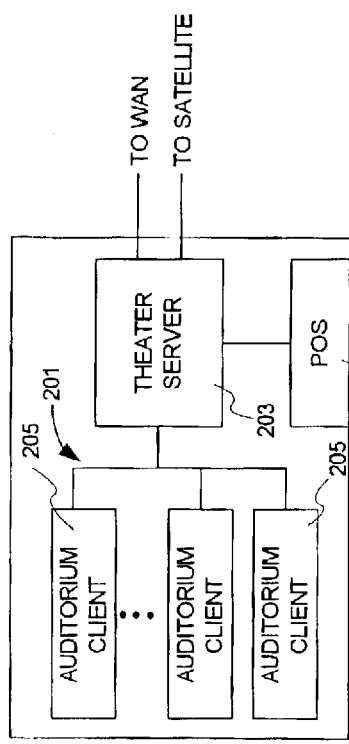
FIG. 2 illustrates in functional block-diagram form components of a theatre system in accordance with the present invention.

FIG. 2 illustrates various data processing and storage components implemented in theatre facilities 200 in a specific implementation. The theatre implementation shown in FIG. 2 is provided to improve understanding of the present invention, but many features of the present invention are effective entirely within a projection booth 300, and so are independent of the particular theatre data handling facilities. Theatre 200 comprise a theatre server 203 and a plurality of auditorium clients 205 coupled together by a theatre network 201. Theatre network 201 may comprise, for example, an available local area network (LAN) such as Ethernet, fibre channel, IP networks and the like having data transfer rates suitable to meet the needs of a particular application. Theatre server 203 implements communication interfaces with satellite 103 and WAN 101 shown in FIG. 1.

Theatre server 203 implements processes and data structures that are used to schedule and coordinate presentation of sequences of content items 107 in the form of, for example, pre-show presentations. Theatre server 203 may be provided as a stand-alone service or may be integrated or interfaced to other systems in a theatre 200. For example, in many theatres a central point of sale (POS) mechanism 207 is provided that maintains auditorium scheduling information that indicates which feature presentation will appear in a particular auditorium. This information is used, for example, to print tickets with specific auditorium information and to indicate when an auditorium is sold out, among other things. It is contemplated that the present invention may integrate with or interface to such a point of sale system such that theatre server 203 becomes aware of auditorium assignments, attendance, and/or other information automatically or semi-automatically. Alternatively, a management tool separate from or instead of the point of sale mechanisms may be provided where integration with a point of sale system is not available or practical. Theatre server 203 receives scheduling information 109, requests and receives content items 107 and implements caches for temporary local storage of content items 107 and scheduling information 109.

A theatre 200 comprises one or more auditoriums. An auditorium is the room in which a film or feature is presented, and many theatres have one to perhaps twenty or thirty auditoriums. Each auditorium client 205 corresponds to a set of software processes that coordinate the presentation of content items 107 in a particular auditorium. Each auditorium will include a projection room 300, shown in FIG. 3, housing projection equipment and audio equipment suitable for presenting a feature presentation (e.g., a film 117) and for presenting the digital content items 107 (e.g., in the form of a pre-show presentation).

The projection and audio equipment may be the same for both types of presentations, although in current implementations the feature presentation equipment comprises conventional 35 mm projection equipment while the pre-show presentation equipment comprises digital projectors and digital audio equipment. Auditorium clients 205 may include interfaces for automating the projection/audio equipment, or the projection/audio equipment may rely on human operators.

Figure 3:
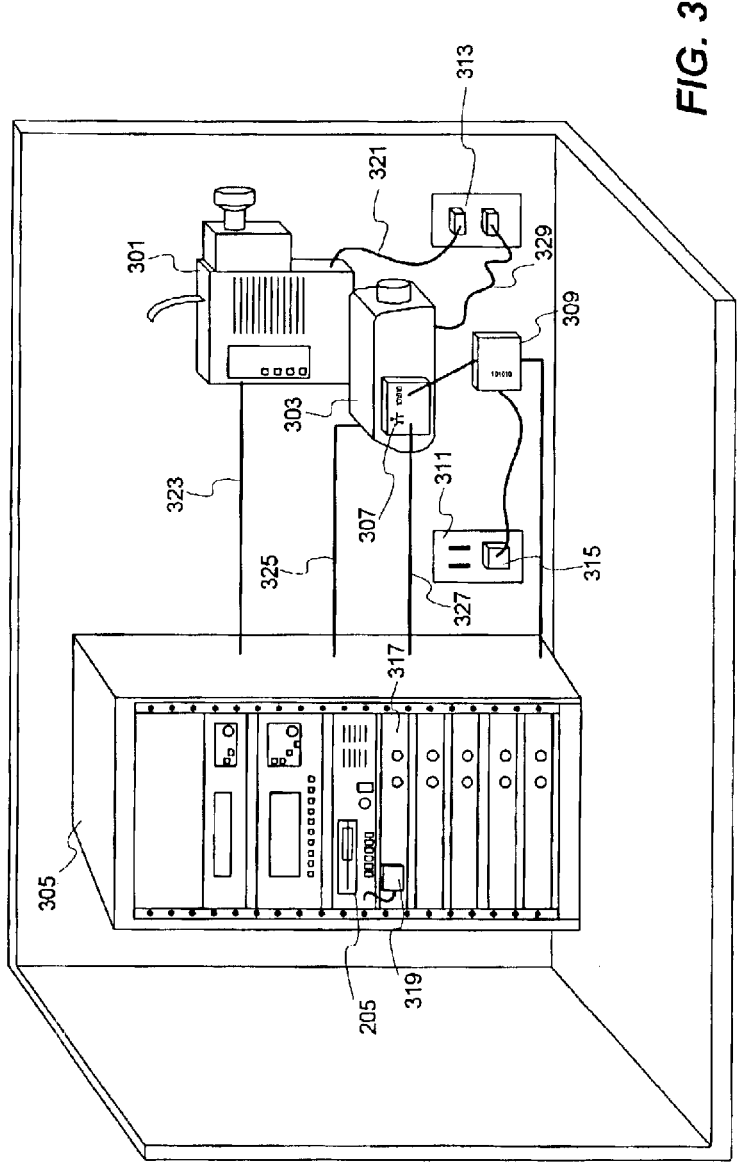
FIG. 3 shows an exemplary projection booth implemented in accordance with the present invention.

FIG. 3 shows an embodiment of a projection room 300 in greater detail. A typical projection room serves one or more auditoriums within a theater 200. In accordance with the present invention, projection room 300 includes both legacy film-based projection equipment such as projector 301, and newer digital projection equipment such as digital projector 303. In addition, projection room may include a slide projector, DVD, HD-DVD, portable drives or other presentation devices (not shown).

Equipment rack 305 houses a variety of audio processing/amplification devices 317 and automation devices as well as auditorium client 205. Other theatre automation equipment traditionally used to automate projector 301 may also be included. For example, projector control devices such as cue detectors, which are mounted to and integrated with the projector 301, generate signals corresponding to cues placed on the film itself. Automation devices such as CA21, CA100, and Christie 3Q automation equipment, available from Christie Digital Systems, Inc., receives these signals and can be programmed to perform desired functions.

Projector 301 receives power over line 321 from, for example, a conventional non-switched outlet 313. In particular embodiments, projector 301 is turned on manually by a projectionist, although this activity may be automated. Projector 301 may produce various industry standard cue signals over line 323 that are also coupled to the automation equipment to perform such functions as raising/lowering curtains, adjusting auditorium lighting, and adjusting audio features.

Switched outlet 311 is implemented in most projection booths 300 and is under control of cinema automation equipment in equipment rack 305. Switched outlet 311 was used to power projection devices such as a slide projector that could tolerate being turned on and off by suddenly removing the power. This feature allowed the cinema automation equipment to provide on/off control functions to devices that did not provide control interfaces themselves. However, because digital projector 303 does not tolerate the sudden on/off power switching provided by switched outlet 311, digital projector 303 is also powered over line 329 by conventional non-switched outlet 313. Although digital projector 303 provides a control interface, it is not suitable for direct control by the traditional switched outlet 311.

Digital projector 303 is coupled to auditorium client 205 to receive video signals using any available video signal encoding and transmission technology. These formats include, without limitation, NTSC (National Television Standards Committee), Phase Alternation Line (PAL), Sequential Couleur avec Memoire (SECAM), S-Video, as well as digital formats such as, RGB, Video Graphics Array (VGA), Super-VGA (SVGA), Super Extended Graphics Array (SXGA), Ultra Extended Graphics Array (UXGA) and a variety of Society of Motion Picture & Television Engineers (SMPTE) video-encoding formats, as well as other formats that may be available or developed as standards or for particular applications. Client 205 typically sends audio information to the audio processing equipment within equipment rack 305.

In many installations, digital projector 303 replaces a slide projector (not shown) to provide more dynamic content than possible with a slide projector. Digital projector 303 typically implements a remote control interface (not shown) which is designed to allow control of digital projector 303 by sending properly formatted signals rather than by manually operating button and controls on the projector 303 itself. More recently, a variety of control modules such as control module 307 are available that couple to the remote control interface of projector 303 to enable more flexible communication and network connectivity to the projector 303. An example control module is the ChristeNET product available from Christie Digital Systems, Inc. This particular device implements various services such as a web server to enable web-based management, SNMP server for e-mail type notifications, Telnet services to enable Telnet-based management, timers, and the like.

Control module 307 implements a network interface for coupling to a local area network (LAN) such as theatre LAN 201 shown in FIG. 2. Control module 307 also implements a serial port configured to control external equipment via the network, essentially taking network commands received over the LAN port and converting them to serial format signals compatible with the external device (not shown) to be controlled. Moreover, the serial port was designed for sending commands to an external device and receiving status information, not for receiving commands intended to control digital projector 303. As a result, all communication directed to control digital projector 303 was delivered over the LAN port on control device 303.

Essentially, legacy film based projection equipment 301 uses a different and independent command communication system than the network control implemented by digital projector 303. One of the most fundamental control functions, turning a projector on and off, was handled by the switched outlet 311 in the case of slide projectors, but is now handled by network commands for digital projector 303. Because digital projector 303 should not be turned on/off by switched outlet 311, the existing automation systems and processes that have coordinated turning off a slide projector when a film projector 301 was turned on, have not been readily available.

The present invention implements a device 315 that senses the state of switched outlet 311 and communicates a signal representing that state to interface module 309. Device 315 can be implemented as a transformer to produce a low voltage AC signal output, or as a DC power supply to produce a DC signal output. In either case, the signal output indicates the state of switched outlet 311, as well as changes in state (e.g., on-off transitions) in switched outlet 311. Interface module 309 is also coupled to auditorium client 205 to receive command signals such as signal indicating a projector on/off command.

The on/off command from auditorium client 205 is responsive to schedule information 109 to indicate when digital content items 107 are scheduled to play. In a particular implementation, interface module 309 performs a logical AND of the signals from client 205 and switched outlet sensor 315 to produce a signal that indicates when a soft shut down or turn on should take place. For example, the switched outlet 311 state or state change indicates that the film-based automation systems is starting to play a movie using projector 301, and the client 205 is ending the playing of digital content through digital projector 303. When this condition occurs, a soft shutdown is initiated by presenting control signals to control module 307. Unlike previous control modules, the control module 307 in accordance with the present invention is programmed to respond to the signals presented by interface module 309 on its serial interface to initiate a soft shut down (or other programmed action) affecting digital projector 303. In this manner, the present invention greatly simplifies the fundamental tasks involved in automatically switching from one projector to another when the two projectors use different control methodologies.

Using scheduling information 109, auditorium client 205 knows when to initiate a pre-show. For example, by determining that a movie is scheduled to start at 7:00 PM, auditorium client 205 will initiate a playback of a sequence of content items 107 at a specified time such as 6:40 PM so that the sequence of content items 107 is presented as desired. In a particular implementation start time for the playback is determined by the length of the sequence of content items that are scheduled and so may vary from instance to instance. For example, if only 15 minutes of content items 107 are scheduled, the playback is initiated at 6:45 PM rather than 6:40 PM. In other implementations, a fixed amount of time is allotted to the content items 107 and content items are replayed or filler content items 107 are added to the schedule to fill the allotted time, if necessary.

Optionally, processes are included in auditorium client 205 to generate one or more notifications to a projectionist or to an automated projection system regarding the start time of a feature presentation. Currently, a feature presentation is provided on film and the film projector needs to be started in synchronization with the end of a pre-show. A human projectionist may be alerted by particular tones, blinking lights, a countdown timer, email notification and/or pager notifications. In a particular example a first notification is provided at 3 minutes before the feature presentation and a second notification is generated when the feature presentation is scheduled to start. This ensures the projectionist will be prepared to start the film-based projector 301. When automated projection equipment is involved, the notification can be made to the automated system to warm up the projector, start the projector or perform other theatre operations such as adjusting lighting, sound, curtains, screen level, and the like.

Using the features of the present invention, a movie scheduled to start at 7:00 PM can be started at precisely 7:00 PM, usually by a projectionist, and the playback of content items 107 stopped at the same time by sensing the state of switched outlet 311 and turning off the lamps of digital projector 301. Because the presentation of content items 107 was initiated at a time selected to ensure all of content items 107 were presented before the start of the movie, there is very little risk that the playback of content items 107 will have already completed, or that content items 107 will remain un-played at the scheduled movie start time. Thus, the present invention avoids "stepping on" the film presentation (i.e., presenting content items overlapping the film presentation) or a noticeable delay between the pre-show and the feature presentation.

Audio processing devices such as a cinema audio processor 317 receive various audio signals from projector 301, client 205 and/or other audio sources. The audio signals are amplified, filtered, and coupled to drive auditorium speakers by the audio processor 317 and other sound system components. A conventional cinema audio processor 317 has two "projector" inputs that are alternatively referred to as "sync" inputs and "optical" inputs. The cinema audio processor 317 also provides a "nonsync" audio input used for receiving two-channel (i.e., left-right) audio signals from alternative sources. These inputs are designed to receive audio information from a projector. The cinema audio processor 317 is able to perform various functions on signals delivered through the projector inputs such as decoding various Dolby formats often used with films, as well as applying Dolby SR or Dolby Pro-Logic processing to two-channel audio signals.

Conventional sound-on-film systems for 35 mm theatre-class projection systems generate a raw audio signal decoded from the optically encoded audio information on the film. This decoded signal is than applied to a projector audio input of the sound system. Audio signals from other audio sources such as computers, disks, tape playback systems, as well as streaming input from satellite and cable links have been handled separately either by using a media adapter or by applying the signals to a non-sync audio input to the sound system. However, the advanced signal processing functions are rarely available to signals arriving on the nonsync audio input.

The present invention implements an audio input adapter 319 enables an unused projector or sync audio input of a sound system to receive audio signals from a non-projector source. In many cases, this enables the existing cinema audio processor and sound system to handle audio from alternative audio sources with the same quality and processing alternatives that are available for projector audio sources. The audio input adapter 319 receives a two-channel audio signal from, for example, a line-out output of a computer's audio card, and generates a signal that is suitable for connection to the projector input of a cinema audio processor. Audio adapter 319 optionally provides filtering, pre-amplification, impedance transformation, and the like to produce an audio signal quality suitable for processing by the projector channel of the cinema audio processor.

Figure 4:
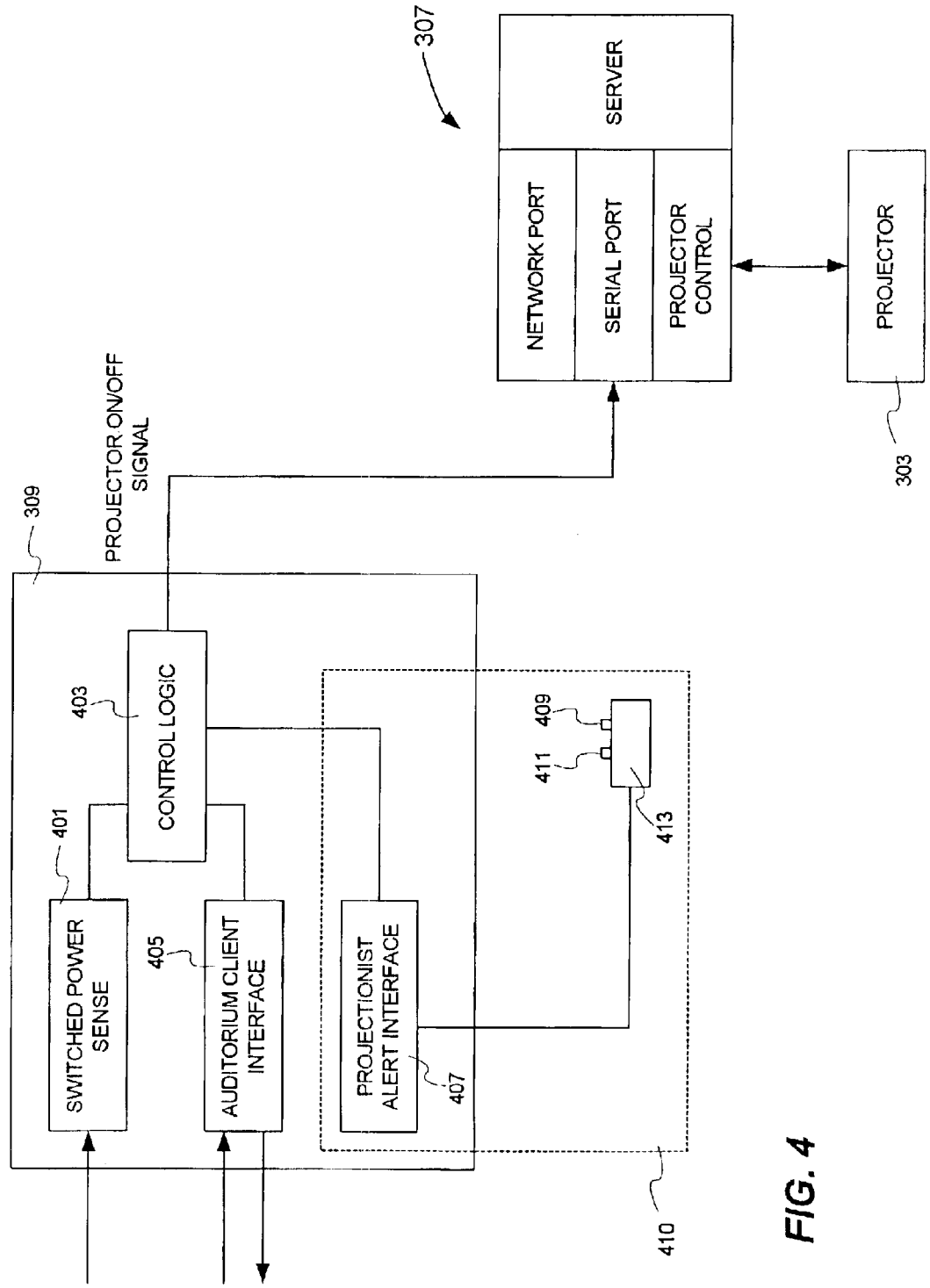
FIG. 4 shows a functional block diagram of an interface module in accordance with an implementation of the present invention.

FIG. 4 illustrates functional components of an exemplary interface module 309 in greater detail. Interface module 309 includes a switched power sense port 401 for coupling to the switched power sense device 315 shown in FIG. 3. The switched power sense port 401 may be implemented as a buffer, a toggle switch, for example. Switched power sense port 401 couples to control logic 403, as does the auditorium client interface 405. Interface 405 is in communication with auditorium client 205 to receive signals indicating that digital content is being played or is scheduled to begin playing, and optionally to send status information to auditorium client 205 indicating state of the interface module 309 and/or switched outlet 311.

In a particular example, control logic 403 implements a logical AND function to produce a projector on/off signal in response to the switched power sense port 403 and the auditorium client interfaced 405 having a predetermined state or change of state. The projector on/off signal is coupled to the serial port of the control module 307. In a particular implementation, the serial port of control module 307 is implemented as a 25-pin connector several of which were unused. The projector on/off signal is asserted on a pair of these unused connectors and the control module 307 is programmed to respond to the projector on/off signal by initiating, for example, a soft turn off or soft turn on of digital projector 303.

As shown in FIG. 4, optionally, processes are included, for example in client 205, to generate one or more notifications to a projectionist or to an automated projection system regarding the start time of a feature presentation. Currently, a feature presentation is provided on film and the film projector needs to be started in synchronization with the end of a pre-show. Even where this process is largely automated by the present invention, supervision and alertness on the part of the projectionist is desired.

Projectionist alert system 410 automatically alerts the theatre staff (e.g. projectionists) of the pending completion of a pre-show. Projectionist alert mechanisms that are contemplated include visual alerts in the form of a changing light 409 implemented on projectionist interface 413. In a particular implementation, a sequence of flashing and steady light(s) indicate progression of the pre-show, such as a flashing light started at 5 minutes before the end of the pre-show, increasing the frequency of flashes at 2 minutes before the end of the pre-show, making the light steady when the pre-show ends and turning off the light when the projector starts. Alternatively, multiple lights 409 and/or multiple colors of lights 409 may be provided to indicate different states to the projectionist. In other implementations, the present invention contemplates sending a message to a mobile pager and/or initiating an audio signal such as a buzzer. A human projectionist may be alerted by particular tones, blinking lights, a countdown timer, email notification and/or pager notifications. When automated projection equipment is involved, the notification can be made to the automated system to warm up the projector, start the projector or perform other theatre operations such as adjusting lighting, sound, curtains, screen level, and the like.

Optionally, projectionist alert system 410 includes a projectionist-operable switch 411 that is coupled back through auditorium client interface 405 to an auditorium client 205. Switch 411 can be used to signal state information, completion of projectionist tasks, and/or assert manual override. Auditorium client 205 executes programmable logic to monitor input from switch 411 and initiate a programmed response. For example, the auditorium client can stop playing digital content 107, restart a sequence of digital content 107, or begin playing digital content 107. Auditorium client 205 will generate an appropriate projector on/off signal to the auditorium client interface, which is then combined with the switched power sense input to control digital projector 303.

FIG. 5 illustrates an exemplary system including various components shown in FIG. 3 and FIG. 4 in block-diagram form. FIG. 5 illustrates a typical installation in which a film projector 301 interacts with a cinema automation system 501, whereas a digital projector 303 interacts with a control module 307. When a film is started a projectionist operates switch 502 to begin execution of a cinema automation program. The cinema automation system 501 may control projector 301, or projector 301 may be manually started at approximately the same time. Cinema automation system 501 typically receives information from a cue detector coupled with projector 301 which indicates various cue events encoded on the film.

As shown in FIG. 5, cinema automation system 501 is coupled to auditorium client 205. In the particular example, this connection comprises a few pins of a serial port within the auditorium client 205, and is used to convey status information to auditorium client 205. This status information is indicated by voltage levels that typically exist in the cinema automation system, and so does not require expensive interface components. For example, the state of switch 502 is readily detected and conveyed as a voltage on a serial port line which auditorium client 205 can be programmed to monitor and detect.

Control module 307 typically provides for one or more input/output ports such as a network interface and a serial port. In FIG. 5, client 205 includes a serial port that is coupled to a serial port of control module 307. In a particular embodiment, the serial port of the control module 307, which is often implemented as a 25-pin RS-232 connection, is used to support both the connection to the control module 307 as well as a junction for physical connections to auditorium client 205 (e.g., a first 9-pin RS-232 connection) and cinema automation system 501 (e.g., a second 9-pin RS-232 connection). Additionally, some of the available conductors in the 25-pin connection may be used to sense the state of switched outlet 311 through, for example, relay 503 labeled R1 in FIG. 5.

In a particular implementation, these connections are provided as a integrated cable assembly having a 25-pin RS-232 port for coupling to control module 307, a first 9-pin RS-232 port for coupling to an available COM port of client 205, a second RS-232 port for coupling to an available port of cinema automation system 501, and a specialized port for sensing the state of switched outlet 311. The specialized port can be implemented, for example, using transformer 315 that, when energized, closes relay 503 allowing a power to flow between two conductors of the 25-pin connector. By using serial connections that often exist in the cinema automation 501, client 205, and control module 307 minimal additional hardware is needed to implement the present invention. Additionally, because the additional hardware is essentially a cable, which are highly reliable, overall reliability of the system is not negatively impacted as may be the case when alternative devices are used.

In operation, a conductor on the COM port of client 205 will transition to a high state to signal control module 307 to turn the digital projector 303 lamps on. Control module 307 sends a "lamp on" command to digital projector 303 periodically, (e.g., every 100 milliseconds) only if both the signal from relay 503 and the signal from auditorium client 205 are in a high condition (e.g., positive voltage state). The invention can be readily adapted to other logic levels as well as both positive and/or negative logic.

Client 205 monitors the connection to projectionist interface 413 to detect a voltage indicating the start and end of the pre-show. For example, when one high condition is detected the show will stop. If a second separate high condition is detected the show will start again. Once a content items 107 are being presented, at a predetermined time before the start of a movie client 205 generates a signal to projectionist interface 413 via its COM port to alert the projectionist through a flashing light on projectionist interface 413 that the movie film projector 301 will need to be started. In the specific example, an amply warned projectionist will be ready to start the film projection by, for example, operating start switch 502 at the time indicated by projectionist interface 413. Upon activating switch 502, cinema automation system 501 turns off switched outlet 311 using processes conventionally used to turn off a slide projector powered by switched outlet 311.

Client 205 monitors the state of switched outlet 311 via the connection between relay 503 and control module 307 to detect a voltage condition indicating the state of switched outlet 311. In a particular embodiment, in response to detecting that switched outlet 311 is off, client 205 signals control module 307 that it is no longer presenting content, and then waits a period of time (e.g., one minute) before stopping the player processes. This signal allows client 205 to reset and be ready to start the playing subsequently scheduled content items 107. In this manner, the present invention leverages a commonly installed function in a cinema automation system 501, specifically, the ability to control switched outlet 311. As noted before, one technique for coordinating these control systems is to implement interfaces and adapters to enable communication of control commands and/or status information between cinema automation system 501 and control module 307. However, this approach increases complexity, expense, and may be less reliable. In contrast, the preferred technique shown in FIG. 5 allows the existing mechanisms supporting control of switched outlet 311 to be leveraged so as to communicate between cinema automation 501 and control module 307 using straightforward signaling mechanisms.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A digital projector interface comprising:
    a switched outlet interface for receiving a signal indicating a condition of a switched power outlet;
    a processor coupled to the switched outlet interface; and
    processes implemented by the processor and responsive to the switched outlet condition to perform a preselected function involving a digital projector in response to the switched outlet condition.

2. The digital projector interface of claim 1 wherein the preselected function comprises causing the digital projector to perform a soft shutdown.

3. The digital projector interface of claim 1 wherein the preselected function comprises causing a fan within the digital projector to operate after a lamp within the digital projector is turned off.

4. The digital projector interface of claim 1 wherein the preselected function comprises causing the digital projector to gradually reduce power to a light source within the digital projector.

5. The digital projector interface of claim 1 wherein the preselected function comprises causing the digital projector to gradually apply power to a light source within the digital projector.

6. The digital projector interface of claim 1 wherein the preselected function comprises generating a message indicating status of the switched outlet.

7. The digital projector interface of claim 1 further comprising a serial port, wherein the switched outlet interface is coupled to receive the signal from the serial port.

8. The digital projector interface of claim 7 further comprising a network interface supporting communication with network coupled devices.

9. A method for controlling a digital projector comprising:
    sensing a condition of a switched power outlet;
    determining at least one programmed response to the sensed condition; and
    performing the programmed response.

10. The method of claim 9 wherein the programmed response comprises initiating a soft shut down of the digital projector.

11. The method of claim 9 wherein the programmed response comprises initiating a soft turn on of the digital projector.

12. The method of claim 9 wherein the sensed condition comprises an on/off state of the switched power outlet.

13. The method of claim 9 wherein the sensed condition comprises a change in an on/off state of the switched power outlet.

14. The method of claim 9 further comprising:
receiving a signal from a scheduling device;
logically combining the signal from the scheduling device with the sensed condition to produce a combined signal; and
performing the programmed response in response to the combined signal.

15. The method of claim 14 further comprising:
generating a projectionist alert based on at least one of the signal from the scheduling device and the sensed condition; and
generating a perceptible notification to communicate the projectionist alert to a projectionist.

16. The method of claim 15 wherein the perceptible notification comprises a light.

17. The method of claim 15 wherein the perceptible notification comprises a flashing light having a variable frequency indicative of the projectionist alert.

18. The method of claim 15 wherein the perceptible notification comprises an audible sound.

* * * * *